(12) United States Patent
Endo

(10) Patent No.: US 6,660,825 B1
(45) Date of Patent: Dec. 9, 2003

(54) LACTONE POLYESTER DIOL, POLYURETHANE OBTAINED THEREFROM, AND SPANDEX FILAMENT THEREOF

(75) Inventor: Toshio Endo, Ohtake (JP)

(73) Assignee: Daicel Chemical Industries, LTD, Sakai (JP)

( * ) Notice: Subject to any disclaimer, the term of this patent is extended or adjusted under 35 U.S.C. 154(b) by 0 days.

(21) Appl. No.: 10/196,708

(22) Filed: Jul. 15, 2002

(51) Int. Cl.⁷ .............................................. C08G 18/42

(52) U.S. Cl. ........................... 528/74; 528/84; 528/906; 528/298; 528/307; 528/354; 560/84; 428/364; 252/182.24

(58) Field of Search ....................... 252/182.24; 528/74, 528/84, 906, 298, 307, 354; 560/84; 428/364

(56) References Cited

U.S. PATENT DOCUMENTS 3,210,440 A * 10/1965 Batzer et al.

OTHER PUBLICATIONS

English–language abstract of Japanese patent application No. 09/153872, Filing Date: Jun. 11, 1997 *Polyurethane Elastic Fiber* Publication No. 11–001822, Publication Date: Jan. 6, 1999; Applicant: Toyobo Co. Ltd.

English–language abstract of Japanese patent application No. 10–294780, Filing Date: Oct. 16, 1998 *Novel Polyurethane* Publication No. 11–189637, Publication Date Jul. 13, 1999; Applicant: Showa Denka KK.

English–language abstract of Japanese patent application No. 56–157181, Filing Date: Oct. 2, 1981 *Production Of Polyurethane Having Excellent Elastic Recovery* Publication No. 58–059212, Publication Date, Apr. 8, 1983; Applicant: Daicel Chem. Ind. Ltd.

* cited by examiner

*Primary Examiner*—Rachel Gorr
(74) *Attorney, Agent, or Firm*—Morgan & Finnegan, L.L.P.

(57) ABSTRACT

The present invention can provide a lactone polyester diol at least containing ϵ-caprolactone and a dibasic acid as constructing component units, and a polyurethane obtained using the diol and an organic diisocyanate can provide a spandex filament which is more excellent in a recovering ability of elasticity, strength, hydrolysis resistance, and heat resistance.

14 Claims, No Drawings

LACTONE POLYESTER DIOL, POLYURETHANE OBTAINED THEREFROM, AND SPANDEX FILAMENT THEREOF

FIELD OF THE INVENTION

The present invention relates to a spandex filament (a polyurethane elastic filament), which is excellent in a recovering ability of elasticity, high tensile strength, hydrolysis resistance, and heat resistance, and a polyurethane to provide the spandex filament and, further, relates to a lactone polyester diol to be used for the polyurethane.

BACKGROUND OF THE INVENTION

A polyurethane having a linear structure is obtained by allowing to react an organic diisocyanate with a long chain diol having hydroxyl groups at both terminals and a relatively low molecular weight diol or diamine having two active hydrogens, which diol or diamine is named a chain extender.

Various proposals have been made for improving a recovering ability of elasticity and hydrolysis resistance in the thus-obtained polyurethane.

As described in JP-A-58059212 Official Gazette, a polyurethane in which a polyethylene glycol adipate polyester is employed is excellent in a recovering ability of elasticity. However, it is poor in hydrolysis resistance.

Further, although a 1,4-butylene glycol adipate polyester has a certain extent of hydrolysis resistance, a polyurethane therefrom is poor in a recovering ability of elasticity. Still further, although a polyurethane obtained from a polycaprolactone polyol is excellent in hydrolysis resistance, weatherability, and heat resistance, it is poor in a recovering ability of elasticity.

As a method for solving a drawback of a polycaprolactone-based polyurethane, the Official Gazette discloses a technology using a specified polycaprolactone polyester polyol obtained by a transesterification reaction of a polyester polyol synthesized by a dehydration esterification of neopentylglycol and adipic acid with ε-caprolactone.

However, the polyurethane described in the Official Gazette does not always exhibit sufficient recovering ability of elasticity and hydrolysis resistance, and therefore, there has been desired a polyurethane in which those properties are further improved.

Further, JP-A-11001822 Official Gazette discloses polyurethane elastic filaments which are excellent in hydrolysis resistance in alkali, in which there are employed 2-n-butyl-2-ethyl-1,3-propane diol and 2,2-diethyl-1,3-propane diol, or the like, as diol components which constitute a polyester polyol.

However, although the polyurethane elastic filaments in the Official Gazette are excellent in hydrolysis resistance in alkali, it has been desired to further improve a recovering ability of elasticity and strength.

Still further, JP-A-11189637 Official Gazette discloses a polyurethane obtained by polyaddition reaction of a polyol compound with a polyisocyanate compound, in which the polyol compound is partially or completely comprised of a polyester polyol which has recurring units represented by general formula (i) and which has a hydroxyl group value of 10–200 and, moreover, 10–100% of residual groups A in the polyester polyol are a residual group of a diol represented by general formula (ii) or (iii).

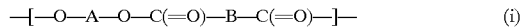

(i)

(ii)

(iii)

(in the formulae, $R^1$ represents an alkyl group or phenyl group having a carbon number of 1–4, $R^2$ is a hydrogen atom or a methyl group, and X represents a single bond or double bond)

However, the polyurethane disclosed in the Official Gazette includes problems that it is very rigid and poor in a recovering ability of elasticity.

Purpose of the present invention is to provide a spandex filament (a polyurethane elastic filament) which is excellent in a recovering ability of elasticity, strength, hydrolysis resistance, and heat resistance, and to provide a polyurethane to prepare thereof and, further, to provide a polyester diol to be used for the polyurethane.

The present inventor has found that the above-described problems can be solved by using a polyester diol obtained from a specific alicyclic diol, ε-caprolactone, and a dibasic acid, as starting materials for the polyurethane, and the present invention has been completed.

SUMMARY OF THE INVENTION

That is, a first aspect of the present invention provides a polyurethane obtained by an organic diisocyanate and a lactone polyester diol obtained by the use of constructing component units comprising at least one of diol (A) selected from diols represented by formulae (1) and (2), ε-caprolactone (B), and a dibasic acid (C),

(1)

(2)

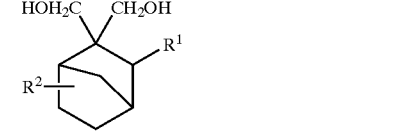

[in the formulae (1) and (2), bonds constructing the ring may be partially even a double bond, and $R^1$ represents an alkyl group or phenyl group having a carbon number of 1–4, and $R^2$ represents a hydrogen atom or a methyl group].

A second aspect of the present invention provides a lactone polyester diol described in the first aspect of the present invention wherein the dibasic acid (C) is an aliphatic dicarboxylic acid and/or aromatic dicarboxylic acid.

A third aspect of the present invention provides a lactone polyester diol described in the first aspect of the present invention wherein the dibasic acid (C) is adipic acid, glutaric acid, pimelic acid, suberic acid, azelaic acid, sebacic acid, dodecanoic diacid, 1,11-undecane dicarboxylic acid, terephthalic acid, isophthalic acid, or 5-sulphosodium isophthalic acid, or a mixture thereof.

A fourth aspect of the present invention provides a lactone polyester diol described in the first to third aspects of the present invention wherein a number average molecular weight ranges in 500–5000.

A fifth aspect of the present invention provides a lactone polyester diol claimed in any one of the first to forth aspects of the present invention wherein the content of constructing unit composed of the diols (A) and the dibasic acid (C) in the polyester ranges in 5/95 to 80/20 (weight ratio) with respect to the content of ε-caprolactone (B) unit.

A sixth aspect of the present invention provides a polyurethane obtained from the lactone polyester diol described in the first to fifth aspects of the present invention and an organic diisocyanate.

A seventh aspect of the present invention provides a spandex filament which comprises the polyurethane described in the sixth aspect of the present invention.

DETAILED DESCRIPTION OF THE INVENTION

Hereinafter, the present invention is illustrated in detail.
<Diol (A)>

The diol (A) employed in the present invention is a diol having a specified alicyclic structure, and it is at least one of diols selected from diols represented by formulae (1) and (2) described below. The alicyclic structure includes a cyclohexane ring or a norbornane ring, or the like.

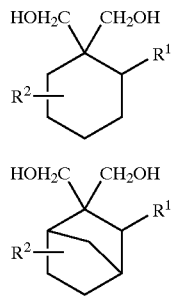

In the formulae (1) and (2), $R^1$ represents an alkyl group having a carbon number of 1–4, preferably, methyl group or ethyl group and, further, $R^2$ may be even any one of a hydrogen atom or a methyl group.

The diol (A) includes a compound having 1,1-cyclohexane dimethanol structure in which 2-position is substituted by an alkyl group or phenyl group having a carbon number of 1–4; a compound having 2,2-norbornane dimethanol structure in which 3-position is substituted by an alkyl group or phenyl group having a carbon number of 1–4; a compound having 3-cyclohexene-1,1-dimethanol structure in which 6-position is substituted by an alkyl group or phenyl group having a carbon number of 1–4; or a compound having 5-norbornene-2,2-dimethanol structure in which 3-position is substituted by an alkyl group or phenyl group having a carbon number of 1–4.

Specifically, it includes 2-methyl-1,1-cyclohexane dimethanol, 2-ethyl-1,1-cyclohexane dimethanol, 2-propyl-1,1-cyclohexane dimethanol, 2-butyl-1,1-cyclohexane dimethanol, 2-phenyl-1,1-cyclohexane dimethanol, 2,3-dimethyl-1,1-cyclohexane dimethanol, 2,4-dimethyl-1,1-cyclohexane dimethanol, 2,5-dimethyl-1,1-cyclohexane dimethanol, 2,6-dimethyl-1,1-cyclohexane dimethanol, 3-methyl-2,2-norbornane dimethanol, 3-ethyl-2,2-norbornane dimethanol, 3-propyl-2,2-norbornane dimethanol, 3-butyl-2,2-norbornane dimethanol, 3-phenyl-2,2-norbornane dimethanol, 6-methyl-3-cyclohexene-1,1-dimethanol, 6-ethyl-3-cyclohexene-1,1-dimethanol, 6-propyl-3-cyclohexene-1,1-dimethanol, 6-butyl-3-cyclohexene-1,1-dimethanol, 6-phenyl-3-cyclohexene-1,1-dimethanol, 5,6-dimethyl-3-cyclohexene-1,1-dimethanol, 4,6-dimethyl-3-cyclohexene-1,1-dimethanol, 3,6-dimethyl-3-cyclohexene-1,1-dimethanol, 2,6-dimethyl-3-cyclohexene-1,1-dimethanol, 3-methyl-5-norbornene-2,2-dimethanol, 3-ethyl-5-norbornene-2,2-dimethanol, 3-propyl-5-norbornene-2,2-dimethanol, 3-butyl-5-norbornene-2,2-dimethanol, and 3-phenyl-5-norbornene-2,2-dimethanol, or the like.

Further, other diol compounds except the diol (A) can be also simultaneously employed within a limit in which an effect by the present invention is not obstructed. The other diol compounds include ethylene glycol, propylene glycol, 1,4-butanediol, 1,6-hexanediol, neopentylglycol, 2-methyl-1,3-propanediol, 3-methyl-1,5-pentanediol, 1,8-nonanediol, diethylene glycol, dipropylene glycol, 1,4-cyclolhexane dimethanol, 2-n-butyl-2-ethyl-1,3-propane diol, 2,2-diethyl-1,3-propane diol, and 2,4-diethyl-1,5-pentane diol, or the like. The other diol compounds may be employed solely or even in combination of two or more kinds thereof.

<Dibasic Acid (C)>

The dibasic acid (C) is employed as acid components for the polyester diol in the present invention.

The dibasic acid (C) is an aliphatic or aromatic dicarboxylic acid, or the like. Specifically, it includes adipic acid, glutaric acid, pimelic acid, suberic acid, azelaic acid, sebacic acid, dodecanoic diacid, 1,11-undecane dicarboxylic acid, terephthalic acid, isophthalic acid, and 5-sulphosodium isophthalic acid, or the like, it preferably includes adipic acid, azelaic acid, sebacic acid, and dodecanoic diacid, or the like. The acid components may be employed solely or even as a mixture composed of two or more kinds thereof.

It is to be noted that the acid components which are starting materials may be even employed as the form of an ester derivative or an acid anhydride.

Other component constructing the polyester diol in the present invention is ε-caprolactone (B), and there may be employed other lactones, for example, a methylated ε-caprolactone such as monomethyl-ε-caprolactone and trimethyl-ε-caprolactone, γ-butyrolactone, and δ-valerolactone, or the like. as auxiliary components for ε-caprolactone within a limit in which an effect by the present invention is not obstructed.

A method for the preparation of the polyester diol in the present invention is not particularly limited and, publicly known methods can be applied. For example, it can be prepared according to a method described in the JP-A-58059212 Official Gazette. That is, it can be prepared through a dehydration esterification and a ring-opening reaction, and a transesterification by heating after mixing the above-described diols, ε-caprolactone, and adipic acid (a one-pot process). Otherwise, it can be also prepared by mixing a polyester diol obtained by a dehydration esterification of a diol with adipic acid, with a polycaprolactone polyol, usually as polycaprolactone diol, which is synthesized by a ring-opening reaction of ε-caprolactone with a polyvalent alcohol, followed by a transesterification thereof. Further, it can be also prepared by a ring-opening polymerization of ε-caprolactone with a polyester polyol having a low molecular weight. Of those, the one-pot process is preferred because of being simple.

The reactions can be conducted at 130–240° C., preferably 140–230° C. from a viewpoint of preventing discoloration and from a viewpoint of preventing a depolymerization reaction of ε-caprolactone.

In the reactions, catalysts are usually employed in 0.05–1000 ppm by weight, preferably 0.1–100 ppm by weight based on total monomers. As the catalysts, there can be employed organic titanium compounds such as tetrabutyl titanate and tetrapropyl titanate, tin compounds such as dibutyltin laurate, tin octylate, dibutyltin oxide, stannous chloride, stannous bromide, and stannous iodide. The reactions can be preferably conducted while streaming an inert gas such as nitrogen gas from a viewpoint of preventing discoloration of a desired product obtained.

As the content of constructing unit of the polyester diol in the present invention, respective raw materials are employed in a proportion so that [the content of constructing unit of the polyester composed of the diol (A) and the dibasic acid]/[the content of constructing unit of ε-caprolactone] ranges in 5/95–80/20 (weight ratio), and preferably 20/80–70/30.

In the polyester diol thus-obtained, a number-average molecular weight ranges in 500–5,000, and preferably 1,500–4,000. In the case of not less than 5,000, crystallinity will increase in a soft segment, resulting in that a spandex filament having sufficient physical properties will not be apt to be obtained. The number-average molecular weight can be measured by a hydroxyl value (JIS K1557).

A polyurethane is prepared from the polyester diol obtained as described hereinabove and an organic diisocyanate. As a method for the preparation of the polyurethane, there are enumerated publicly-known methods, for example, methods described in the JP-A-58059212 Official Gazette and JP-A-11001822 Official Gazette, or the like., and it is prepared according to the publicly-known methods.

That is, there is a one-shot method in which a polyester diol, a low molecular weight diol or diamine, which are a chain extender, and an organic diisocyanate are allowed to collectively react under the presence or absence of solvents, or a prepolymer method in which a prepolymer is prepared by allowing to previously react a polyester diol with an organic diisocyanate, and then, a low molecular weight diol is allowed to react with the prepolymer under the presence or absence of solvent. A melting polymerization method conducted under the absence of solvents is preferred from a viewpoint of costs. In that case, a formulation ratio of raw materials is 0.5–1.5, and preferably 0.8–1.2 as the ratio (NCO groups in the organic diisocyanate)/(total OH groups in the polyester diol and the low molecular weight diol). As the solvents, there are enumerated toluene, xylene, ethyl acetate, butyl acetate, methyl ethyl ketone, dimethylformamide, and tetrahydrofuran, or the like.

Examples of the organic diisocyanate to be used in the present invention include 2,4-tolylene diisocyanate, 2,6-tolylene diisocyanate, p-phenylene diisocyanate, 4,4'-diphenylmethane diisocyanate, m-phenylene diisocyanate, hexamethylene diisocyanate, tetramethylene diisocyanate, 2,4-naphthalene diisocyanate, 4,4'-diphenylene diisocyanate, p-xylene diisocyanate, m-xylene diisocyanate, 4,4'-diisocyanate dicyclohexane, 4,4'-diisocyanate dicyclohexylmethane, and isophorone diisocyanate, or the like. These may be used solely or even in combination of two or more kinds.

As the above-described low molecular weight diol which is a chain extender, there can be employed the diols to be employed in the present invention or the diol compounds which can be employed together as described hereinabove. As the diamine which is a chain extender, there can be employed ethylene diamine, hydrazine, isophorone diamine, metaphenylene diamine, 4,4'-diaminodiphenylmethane, diaminodiphenylsulphone, and 3,3'-dichloro-4,4'-diaminodiphenylmethane, or the like.

The polyurethane obtained by the above-described methods is employed in a variety of uses in which a usual polyurethane is employed, for example, a thermoplastic elastomer, a hard or soft urethane foam, an adhesive, an artificial leather, synthesized leather, and a coating, or the like, and particularly, it is preferred to employ for a spandex filament.

As a spinning method for obtaining a spandex filament from the polyurethane in the present invention, there are enumerated publicly-known methods, for example, a dry spinning method, a wet spinning method, and a melt-spinning method, or the like. Of the methods, the melt-spinning method is preferred from a viewpoint of costs. Further, there can be obtained a filament having further high physical properties by heat treatment of an elastic filament after spinning.

In the spandex filament of the present invention, there can be also optionally added an antioxidant such as a phenol derivative; an ultraviolet ray absorbent such as a substituted benzotriazole; and an anti-blocking agent such as a higher fatty acid metal salt and a silicone compound; or the like.

The spandex filament provided by the present invention is excellent in a recovering ability of elasticity, strength, and hydrolysis resistance, and it is employed in a general use style, that is, a mix-knitted or mix-woven textile with a nylon and cotton, or the like.

Particularly, in the case that the cotton is employed as a material for mix-knitting or mix-weaving, the textile shows an excellent hydrolysis resistance even though it is exposed to post treatment steps after mix-knitting or mix-weaving, that is, a boiling-off step, bleaching step, and a mercerization step, or the like in which it is treated at a high temperature under an acid or alkali atmosphere.

EXAMPLES

Hereinafter, the present invention will be specifically illustrated by Examples, which however shall not limit the present invention thereto. It is to be noted that in the Examples and Comparative Examples, "part" is based on weight so far as not being designated. Further, abbreviations are used for compounds employed in the Examples and Comparative Examples.

Table 1 shows relationship between the abbreviations and the corresponding compounds.

It is to be noted that evaluations of hydrolysis resistance in an alkali for the polyurethane elastic filaments obtained were conducted in an alkali atmosphere as described below. (Hydrolysis Resistance in an Alkali for the Polyurethane Elastic Filaments)

The polyurethane elastic filaments were immersed in an aqueous solution of sodium hydroxide of 60 g/liter at 98° C. for 30 minutes under constant extension, and hydrolysis resistance was evaluated by retention ratio of strength and retention ratio of stress in 200%-extension in relation to the polyurethane elastic filaments before and after immersion.

(1) 200%-stress: stress in 200%-extension
(2) Retention ratio of strength: [(strength after alkali treatment)/(strength before alkali treatment)]×100
(3) Retention ratio of 200%-stress: [(200%-stress after alkali treatment)/(200%-stress before alkali treatment)]×100

TABLE 1

| abbreviation | Compound |
|---|---|
| AA | adipic acid |
| CL | ε-caprolactone |
| NPD | neopentylglycol |
| BD | 1,4-butanediol |
| HD | 1,6-hexanediol |
| MPD | 3-methyl-1,5-pentanediol |
| MCHDM | 2-methyl-1,1-cyclohexane dimethanol |
| MNDM | 3-methyl-2,2-norbornane dimethanol |
| MCEDM | 6-methyl-3-cyclohexene-1,1-dimethanol |

<Examples 1–10>

There were continuously fed 101 parts of respective polyester polyols having an average molecular weight of 2,000 thermally melted at 80° C. which are shown in Table 2, 39 parts of MDI (4,4'-diphenylmethane diisocyanate) thermally melted at 45° C., and 9.5 parts of BD into a twin-screw extruder using a volume displacement pump to conduct a continuous melt-polymerization at 240° C. A polyurethane produced was extruded in a strand state into water to obtain pellets by cutting. The pellets were dried while streaming nitrogen gas at 80° C. for 24 hours.

The pellets were spun at 217° C. and a spinning speed of 600 m/minute by a spinning machine which is a single screw extruder to obtain a polyurethane elastic filament which is a monofilament having 40 denier (d). Various physical properties and hydrolysis resistance in alkali were evaluated using the polyurethane elastic filament obtained. Table 3 shows results thereof. All the results show excellent filament properties and hydrolysis resistance in alkali.

TABLE 2

| | component ratio of diol (mol %) | | | | | | | PE (wt %) | CL (wt %) |
|---|---|---|---|---|---|---|---|---|---|
| | MCHDM | MNDM | MCEDM | NPG | ED | BD | HD | DIOL/AA | CL |
| Example 1 | 100 | | | | | | | 40 | 60 |
| Example 2 | | 100 | | | | | | 40 | 60 |
| Example 3 | | | 100 | | | | | 40 | 60 |
| Example 4 | 100 | | | | | | | 20 | 80 |
| Example 5 | 100 | | | | | | | 60 | 40 |
| Example 6 | 100 | | | | | | | 80 | 20 |
| Example 7 | 50 | | | 50 | | | | 40 | 60 |
| Example 8 | 50 | | | | 50 | | | 40 | 60 |
| Example 9 | 50 | | | | | 50 | | 40 | 60 |
| Example 10 | 50 | | | | | | 50 | 40 | 60 |
| Comparative Example 1 | 30 | | | | | 70 | | 100 | 0 |
| Comparative Example 2 | 50 | | | | | | 50 | 100 | 0 |
| Comparative Example 3 | | | 100 | | | | | 40 | 60 |
| Comparative Example 4 | 100 | | | | | | | 100 | 0 |
| Comparative Example 5 | | | | | | | 100 | 100 | 0 |
| Comparative Example 6 | | | | | | | | 0 | 100 |
| Comparative Example 7 | 100 | | | | | | | 95 | 5 |

In the Table, DIOL/AA means a polyester PE prepared from a diol and adipic acid (a dicarboxylic acid), and PE (wt %) shows total of constructing units of the polyester PE and constructing units of ε-caprolactone, that is, it shows weight proportion of constructing units of the polyester PE in polyester polyols.

TABLE 3

| | Strength (g/d) | Extension (%) | 200%-stress (g/d) | Alkali | | | |
|---|---|---|---|---|---|---|---|
| | | | | strength after treatment (g/d) | retention ratio 1 (%) | 200%-stress (g/d) | retention ratio 2 (%) |
| Example 1 | 1.56 | 510 | 0.36 | 1.45 | 93 | 0.33 | 92 |
| Example 2 | 1.54 | 514 | 0.36 | 1.46 | 95 | 0.34 | 94 |
| Example 3 | 1.58 | 518 | 0.36 | 1.50 | 95 | 0.34 | 94 |
| Example 4 | 1.65 | 504 | 0.39 | 1.35 | 82 | 0.32 | 82 |
| Example 5 | 1.50 | 528 | 0.34 | 1.38 | 92 | 0.31 | 90 |

TABLE 3-continued

| | Strength (g/d) | Extension (%) | 200%-stress (g/d) | Alkali | | | |
| --- | --- | --- | --- | --- | --- | --- | --- |
| | | | | strength after treatment (g/d) | retention ratio 1 (%) | 200%-stress (g/d) | retention ratio 2 (%) |
| Example 6 | 1.40 | 547 | 0.32 | 1.37 | 98 | 0.31 | 96 |
| Example 7 | 1.41 | 513 | 0.33 | 1.27 | 90 | 0.29 | 89 |
| Example 8 | 1.48 | 521 | 0.32 | 1.30 | 88 | 0.28 | 86 |
| Example 9 | 1.52 | 524 | 0.34 | 1.35 | 89 | 0.29 | 85 |
| Example 10 | 1.58 | 512 | 0.36 | 1.45 | 92 | 0.32 | 88 |
| Comparative Example 1 | 1.28 | 460 | 0.32 | 1.10 | 86 | 0.26 | 82 |
| Comparative Example 2 | 1.19 | 512 | 0.28 | 0.98 | 82 | 0.23 | 82 |
| Comparative Example 3 | 1.52 | 518 | 0.35 | 0.99 | 65 | 0.22 | 63 |
| Comparative Example 4 | 0.75 | 320 | 0.12 | 0.56 | 75 | 0.09 | 72 |
| Comparative Example 5 | 1.76 | 405 | 0.44 | 0.97 | 55 | 0.23 | 53 |
| Comparative Example 6 | 1.79 | 402 | 0.47 | 0.98 | 55 | 0.25 | 53 |
| Comparative Example 7 | 1.29 | 458 | 0.33 | 1.10 | 85 | 0.27 | 81 |

<Comparative Examples 1–7>

As shown in Table 3, polyurethane elastic filaments were obtained by the same methods as in the Examples using polyester polyols prepared from adipic acid and at least one of diols selected from MCHDM (2-methyl-1,1-cyclohexane dimethanol), MNDM (3-methyl-2,2-norbornane dimethanol), and MCEDM (6-methyl-3-cyclohexene-1,1-dimethanol) to evaluate filament physical properties and hydrolysis resistance in alkali. In the polyester polyols, the content of constructing units composed of the diols and the dibasic acid in the polyester does not range in 5/95 to 80/20 (weight ratio) with respect to the content of ε-caprolactone unit. Table 3 shows results thereof.

As clearly shown in the Table 3, it is confirmed that strength and stress in 200%-extension do not lower in the polyurethane elastic filaments obtained in the Examples 1–10 compared to those in the Comparative Examples after hydrolysis in alkali, in which satisfactory physical properties of filaments are obtained. In the polyurethane elastic filaments obtained in the Examples 1–10, the content of constructing units composed of the diols and the dibasic acid in the polyester ranges in 5/95 to 80/20 (weight ratio) with respect to the content of ε-caprolactone unit.

Diols employed in the polyurethane elastic filaments are prepared from adipic acid and at least one of diols selected from MCHDM (2-methyl-1,1-cyclohexane dimethanol), MNDM (3-methyl-2,2-norbornane dimethanol), and MCEDM (6-methyl-3-cyclohexene-1,1-dimethanol).

By the present invention, there can be obtained polyurethane elastic filaments which are excellent in hydrolysis resistance in alkali and heat resistance, and which have higher tensile strength. Accordingly those can largely contribute to industrial fields.

What is claimed is:

1. A lactone polyester diol obtained by reaction of one or more diols having formula (1) or (2)

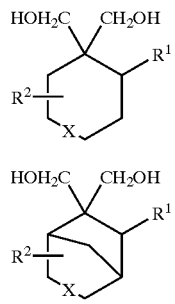

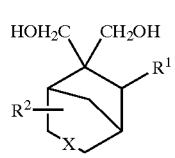

with ε-caprolactone and one or more dibasic acids, wherein $R^1$ is phenyl or $C_1$–$C_4$ alkyl, $R^2$ is H or methyl, and X is a single or double bond.

2. The lactone polyester diol claimed in claim 1, wherein the one or more dibasic acids are selected from the group consisting of aliphatic dicarboxylic acids and aromatic dicarboxylic acids.

3. The lactone polyester diol claimed in claim 1, wherein the one or more dibasic acids are selected from the group consisting of adipic acid, glutaric acid, pimelic acid, suberic acid, azelaic acid, sebacic acid, dodecanoic diacid, 1,11-undecanedicarboxylic acid, terephthalic acid, isophthalic acid, and 5-sulphosodium isophthalic acid.

4. The lactone polyester diol claimed in any one of claims 1–3, wherein the number average molecular weight is between 500 and 5000.

5. The lactone polyester diol claimed in any one of claims 1–3, wherein the ratio of (diol and dibasic acid) to ε-caprolactone is between 5/95 and 80/20 by weight.

6. The lactone polyester diol claimed in claim 4, wherein the ratio of (diol and dibasic acid) to ε-caprolactone is between 5/95 and 80/20 by weight.

7. A polyurethane obtained from the lactone polyester diol claimed in any one of claims 1–3, and an organic diisocyanate.

8. A polyurethane obtained from the lactone polyester diol claimed in claim 4, and an organic diisocyanate.

9. A polyurethane obtained from the lactone polyester diol claimed in claim 5, and an organic diisocyanate.

10. A polyurethane obtained from the lactone polyester diol claimed in claim 6, and an organic diisocyanate.

11. A spandex filament comprising the polyurethane claimed in claim 7.

12. A spandex filament comprising the polyurethane claimed in claim 8.

13. A spandex filament comprising the polyurethane claimed in claim 9.

14. A spandex filament comprising the polyurethane claimed in claim 10.

* * * * *